US006313624B1

(12) United States Patent
Alhorn et al.

(10) Patent No.: US 6,313,624 B1
(45) Date of Patent: Nov. 6, 2001

(54) POSITION SENSOR WITH INTEGRATED SIGNAL-CONDITIONING ELECTRONICS ON A PRINTED WIRING BOARD

(75) Inventors: Dean C. Alhorn, Huntsville; David E. Howard, Hazel Green; Dennis A. Smith, Athens, all of AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/208,401

(22) Filed: Nov. 27, 1998

(51) Int. Cl.[7] .............................. G01B 7/30; H02K 11/00; H01F 21/04; H01F 27/36; G08C 19/46
(52) U.S. Cl. ............................... 324/207.17; 324/207.25; 310/68 B; 318/661; 336/84 R; 336/122; 340/870.32
(58) Field of Search ..................................... 324/173, 174, 324/207.12, 207.15–207.23, 207.25; 73/514.39; 336/122, 123, 84 R, 84 C, 84 M, 87; 341/15; 318/660, 661, 799; 310/68 B, 168; 340/870.31, 870.32

(56) References Cited

U.S. PATENT DOCUMENTS

| | | | |
|---|---|---|---|
| 4,533,902 | * | 8/1985 | Baker et al. ................. 324/207.25 X |
| 4,682,104 | * | 7/1987 | Lombard et al. ................. 324/207.17 |
| 5,122,741 | * | 6/1992 | Ohsumi ........................ 324/207.25 X |
| 5,150,115 | * | 9/1992 | deJong et al. ................... 340/870.31 |
| 5,637,945 | * | 6/1997 | Yamamuro et al. ........... 310/68 B X |
| 5,675,250 | * | 10/1997 | Berglund et al. ................ 324/207.25 |
| 5,847,483 | * | 12/1998 | Suzuki et al. ................ 324/207.15 X |

* cited by examiner

Primary Examiner—Gerard R. Strecker
(74) Attorney, Agent, or Firm—James J. McGroary

(57) ABSTRACT

A position sensor, such as a rotary position sensor, includes the signal-conditioning electronics in the housing. The signal-conditioning electronics are disposed on a printed wiring board, which is assembled with another printed wiring board including the sensor windings to provide a sub-assembly. A mu-metal shield is interposed between the printed wiring boards to prevent magnetic interference. The sub-assembly is disposed in the sensor housing adjacent to an inductor board which turns on a shaft. The inductor board emanates an internally or externally generated excitation signal that induces a signal in the sensor windings. The induced signal represents the rotary position of the inductor board relative to the sensor winding board.

3 Claims, 5 Drawing Sheets

POSITION SENSOR WITH INTEGRATED SIGNAL-CONDITIONING ELECTRONICS ON A PRINTED WIRING BOARD

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

The invention is directed to a position sensor, particularly a rotary position sensor, with or without integrated signal-conditioning electronics.

2. Description of Related Art

Rotary position sensors are instrumental in the control of rotary motion. The sensors are used for position feedback and position information.

Sensor resolution, accuracy, cost, and size are key specifications in choosing a rotary sensor. There are several different types of rotary position sensors in general use. These include, but are not limited to, resolvers, encoders (optical and magnetic), Hall-effect sensors and potentiometers.

Resolvers have several disadvantages. They are bulky, difficult to manufacture, and relatively expensive for precision units, namely, over $500.

The main disadvantage of encoders is that they provide only discrete position information. In other words, encoders output position information only in terms of discrete positions, steps, or pulses per revolution (PPR), and the relative spacing among the positions, steps, or PPR determines the resolution of an encoder. Low-resolution encoders can be relatively inexpensive, namely, approximately $50, but highly accurate and absolute encoders can be very expensive. Some laser encoders offer high accuracy and resolution, but at a cost of several thousand dollars.

Hall-effect devices are relatively inexpensive, but they are not very accurate in a linear mode. Hall devices also are affected by fluctuating magnetic fields and require a fixed air gap.

Potentiometers are relatively inexpensive. However, they are electrically noisy.

Each of these sensors also requires external electronics to signal-condition the raw sensor output. These sensors thus have a disadvantage in that the external electronics are not incorporated inside the sensor housing.

Integrating the electronics would require another manufacturing procedure, increase device cost and make the sensors larger and more bulky. In some cases, such as for Hall-effect sensors, including the signal conditioning electronics would possibly more than double the size of the original sensor. There would also be the problem of interference between the signal-conditioning electronics and other components of the sensor.

U.S. Pat. No. 6,246,228, entitled Non-contact Linear Actuator Position Sensor and Controller Insensitive to Air Gap Between Armature and Magnetic Bracket, whose disclosure is incorporated by reference in its entirety into the present disclosure, teaches a position sensor or controller that generates a response signal in existing armature windings of an actuator and detects the response signal to determine the position of the armature. To generate the response signal, the actuator includes a sensor excitation winding near the armature. Two sensor excitation windings can be provided, above and below the armature, to cancel out z components and thus allow for a variable gap. The sensor excitation winding or windings are supplied with an excitation signal to induce the response signal in the armature windings. The response signal is derived by differentially amplifying and frequency filtering a raw output of the armature windings. The response signal is demodulated to determine position. If a position controller rather than a mere sensor is desired, the position signal can be buffered, PID compensated, amplified, and fed back to the armature windings.

U.S. Pat. No. 6,104,328, filed on Nov. 27, 1998 entitled Resolver to 360E Linear Analog Converter and Method, is also incorporated herein in its entirety.

SUMMARY OF THE INVENTION

It is an object of the invention to provide a rotary position sensor that overcomes the above-noted disadvantages.

It is another object of the invention to provide a rotary position sensor that provides internal signal conditioning and outputs a usable rotary position signal.

It is a further object of the invention to provide a rotary position sensor that is electrically similar to a conventional resolver but that is mechanically different and easier to manufacture.

It is a still further object of the invention to provide a rotary position sensor that expands on the concepts presented in the above-cited patents and that provides a rotary position sensor mechanism that is continuous, light-weight, low-cost, and easy to assemble.

To achieve these and other objects, the present invention is directed to a position sensor comprising: (a) a housing; (b) a movable member, disposed at least partially in the housing, for being moved in accordance with the position to be sensed; (c) a first sensor component, disposed in the housing, for emanating an internally or externally generated excitation signal; and (d) a second sensor component disposed in the housing, the second sensor component comprising: (i) raw signal producing means for producing a raw signal induced by the excitation signal in response to a relative displacement between the first sensor component and the second sensor component; and (ii) signal conditioning means for converting the raw signal into a position-indicating signal; the movable member being secured to at least one of the first and second sensor components so that movement of the movable member causes the relative displacement.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

A preferred embodiment will now be set forth. This preferred embodiment is based on a rotary position sensor with the additional inclusion of signal-conditioning electronics. However, the rotary position sensor can be operated as a standalone device without signal conditioning electronics.

First, individual components will be described with reference to FIGS. 1A–1H. Since the rotary position sensor is based on a printed wiring board, incorporation of the signal-conditioning electronics is straightforward.

Figure 1A:
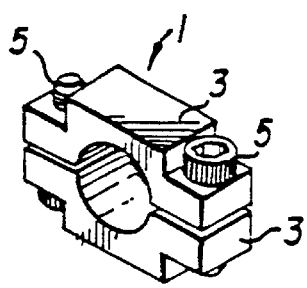
FIGS. 1A–1H show various components of the sensor according to the preferred embodiment.
Figure 1B:
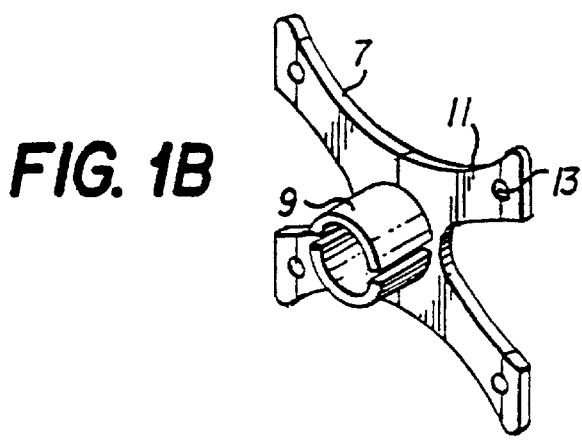

FIG. 1A shows hub clamp 1, which includes hub clamp portions 3 tightened by Allen screws or other tightening fasteners 5. FIG. 1B shows shaft hub 7, which has hub portion 9 and wing portions 11 with screw holes 13.

Figure 1C:
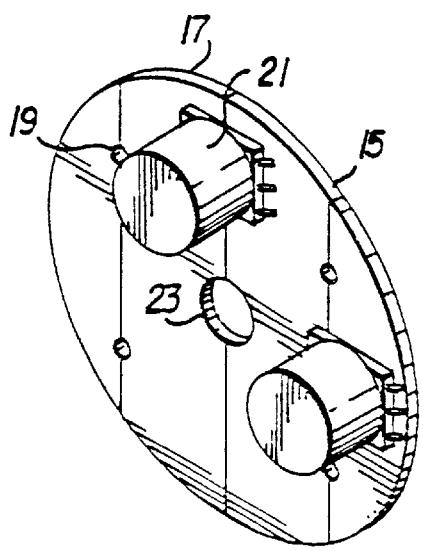
Figure 1D:
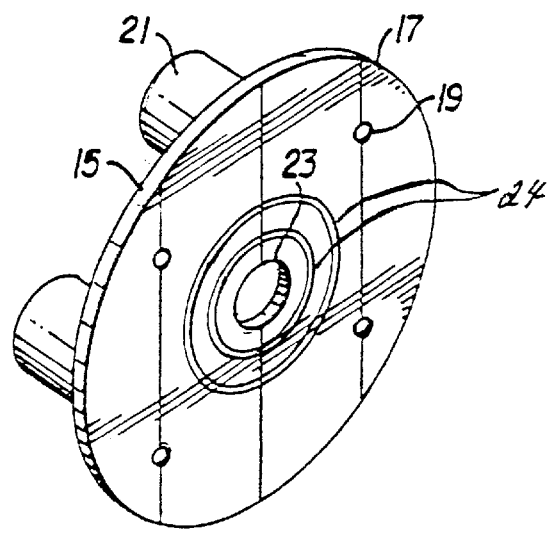

FIGS. 1C and 1D show front and back views, respectively, of inductor board 15. In inductor board 15, printed wiring board 17 has screw holes 19 therein and has inductors 21 mounted thereon. Printed wiring board 17 also has shaft hole 23 formed therein. Inductors 21 are wire-wound and are mechanically spaced 90° apart. Inductors 21 use high-frequency sine and cosine excitation signals that are sent to inductor board 15 through slip rings 24.

Figure 1E:
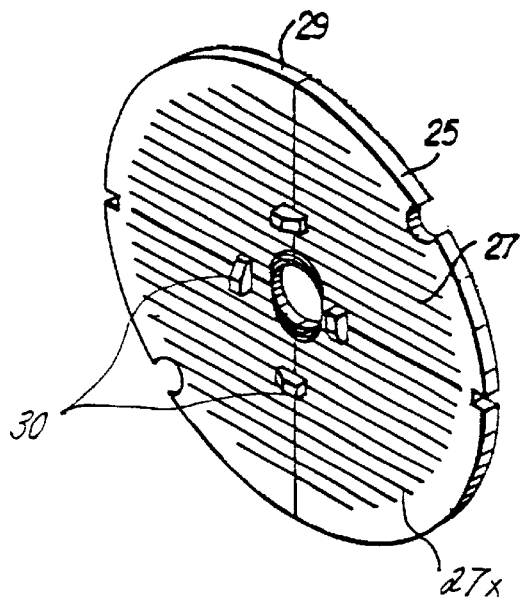
Figure 1F:
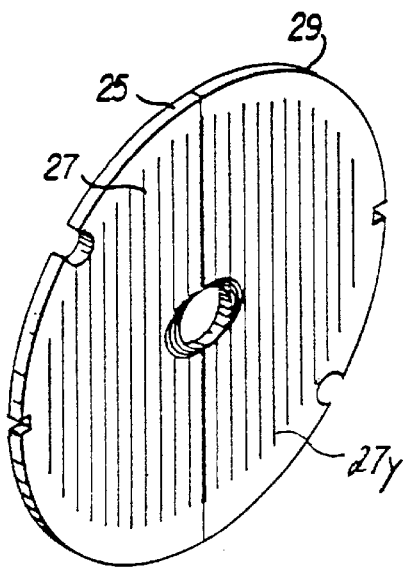

FIGS. 1E and 1F show front and rear views, respectively, of sensor winding board 25, which has sensor windings 27 formed on printed wiring board 20. Sensor windings 27 include two sets of sensor windings, x sensor windings 27$x$ and y sensor windings 27$y$, which are orthogonal to each other. Sensor windings 27 are transformer-coupled to inductors 21 such that the excitation signals supplied to inductors 21 induce a signal in sensor windings 27. The induced signal is the same as the induced signal that a conventional resolver would generate; thus, the position sensor is electrically identical to a resolver in that it accepts a standard resolver input and generates a standard resolver output. Conventional resolvers are discussed in U.S. Pat. Nos. 6,104,328 and 6,138,131 to Alhorn, et al., both of which will be incorporated herein by reference, infra. Sensor winding board 25 also has brushes 30 for transmitting the excitation signals to slip rings 24. Sensor winding board 25 is rigidly mounted to prevent rotation; thus, sensor winding board 25 and inductor board 15 rotate relative to each other. Of course, inductor board could be rigidly mounted to prevent rotation instead, as long as boards 15 and 25 still underwent relative motion.

Figure 1G:
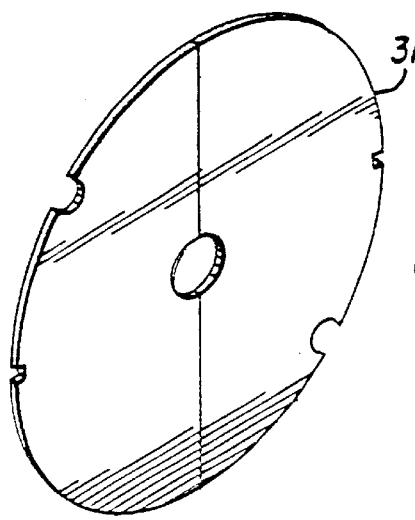

FIG. 1G shows mu-metal shield 31.

Figure 1H:
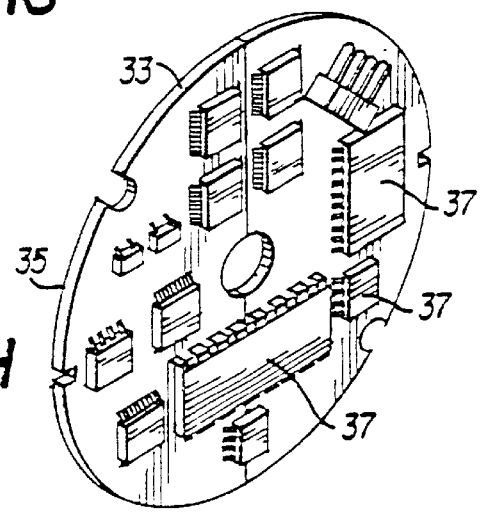

FIG. 1H shows signal-conditioning electronics board 33, which has printed wiring board 35 with electronics 37 disposed thereon. Electronics 37 can be of any of many types of signal conditioning electronics. If an analog output corresponding to the rotary position is desired, circuits developed by NASA that can be used include a continuous 360E linear arctangent circuit and a resolver to 360E linear analog converter. Such circuits are disclosed in U.S. Pat. Nos. 6,104,328 and 6,138,131, both of which are incorporated herein by reference in their entirety. If a digital output is desired, a resolver-to-digital circuit can be used. The position sensor can use an externally or internally generated excitation signal. For example, the excitation signal may be provided from an external source such as a function generator in communication with the position sensor; conversely, the excitation signal may be provided by an internal source such as a wave-generating microchip within the system. Electronics 37 can be formed of discrete components, integrated into a single application-specific integrated circuit (ASIC) or provided in any other suitable manner. The use of an ASIC simplifies the design, manufacturing and assembly of the position sensor.

Figure 2A:
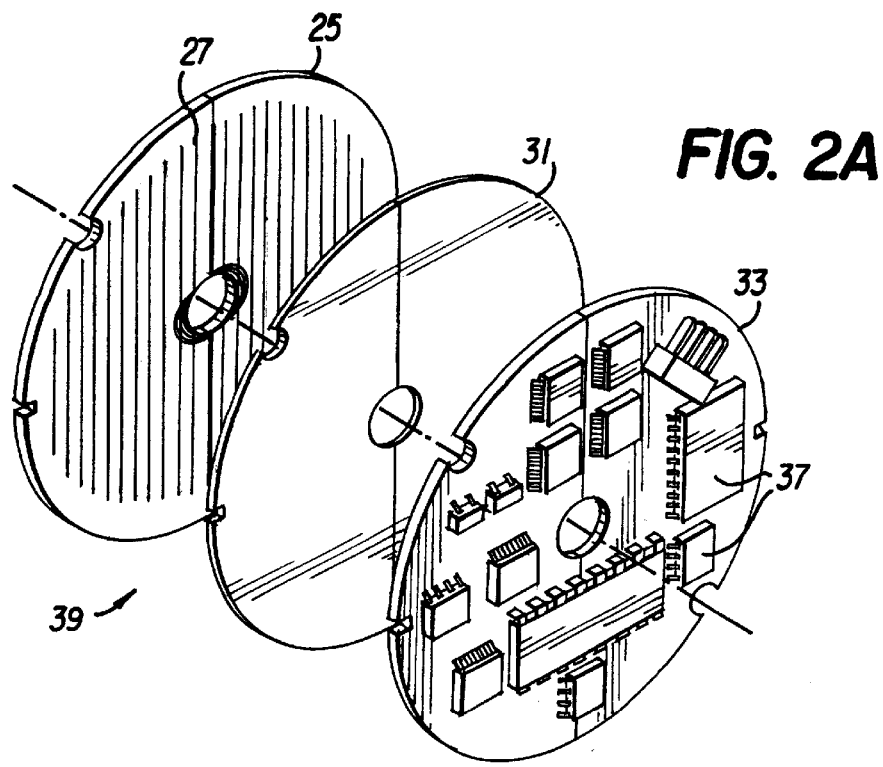
FIGS. 2A–2C show various views of a sensor board sub-assembly used in the sensor.
Figure 2B:
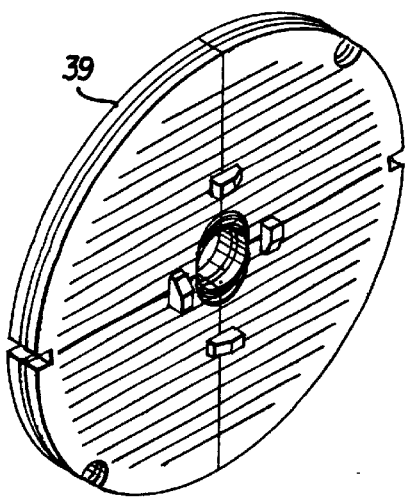
Figure 2C:
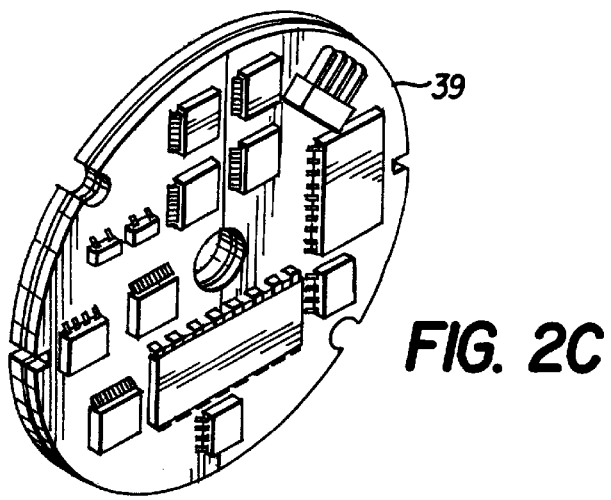

The assembly of a sensor board sub-assembly will be set forth with reference to FIGS. 2A–2C. As shown in FIG. 2A, sensor winding board 25, mu-metal shield 31 and signal-conditioning electronics board 33 are assembled in that order to form sensor board sub-assembly 39, which is shown in a front view in FIG. 2B and in a rear view in FIG. 2C. Sub-assembly 39 incorporates electronics 37 with sensor wiring 27 by way of mu-metal shield 31, which prevents any magnetic coupling between sensor board 25 and signal-conditioning electronics board 33.

Figure 3A:
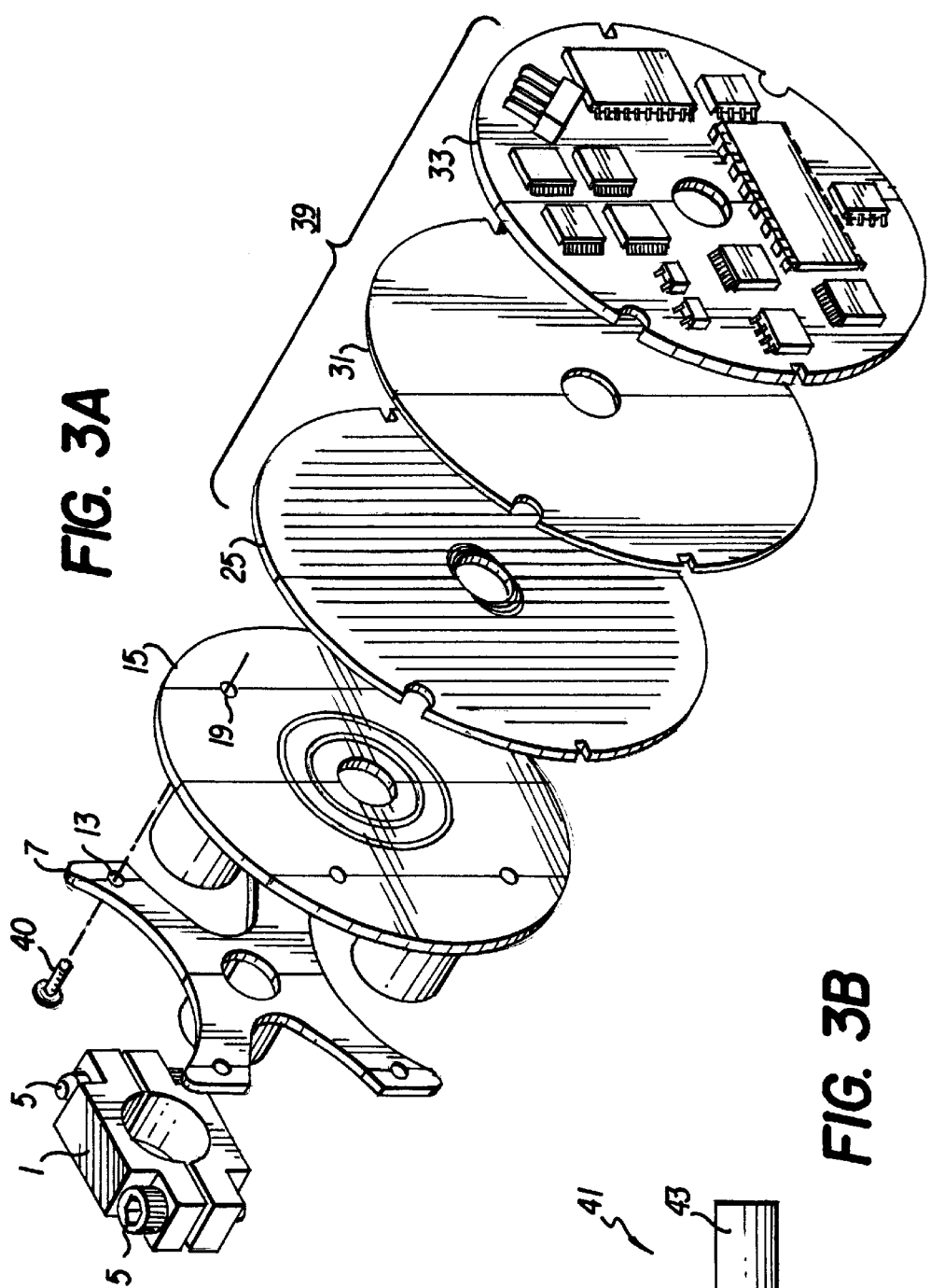
FIGS. 3A–3C show various views of a sensor assembly incorporating the sensor board subassembly of FIGS. 2A–2C.
Figure 3B:
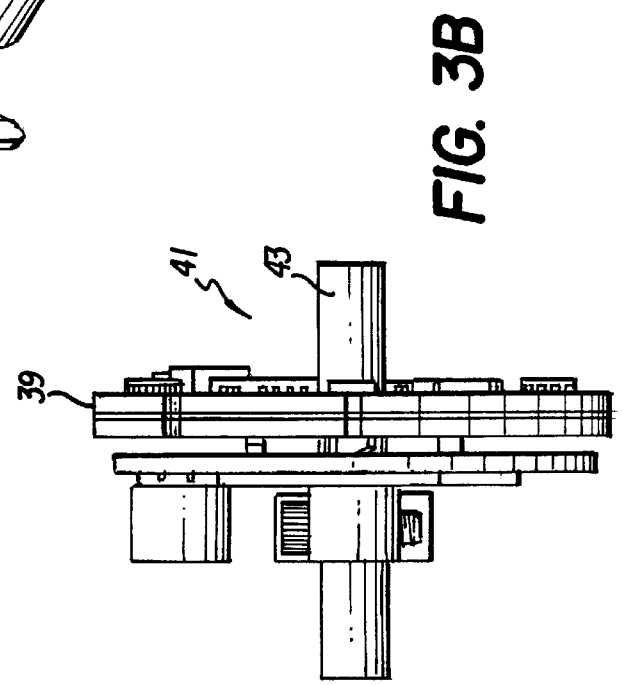
Figure 3C:
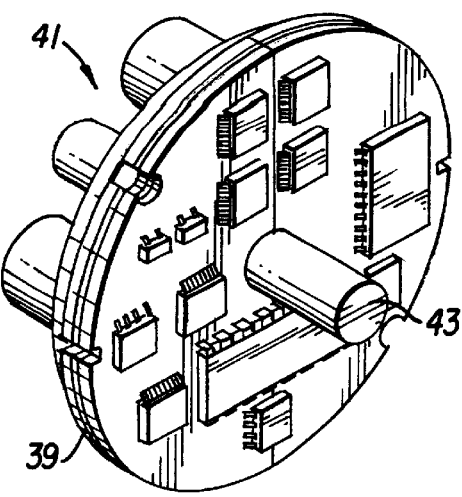

FIGS. 3A–3C show the incorporation of sensor board sub-assembly 39 into a sensor assembly. As shown in FIG. 3A, hub clamp 1, shaft hub 7, inductor board 15, and sensor board sub-assembly 39 (made up of sensor winding board 25, mu-metal shield 31, and signal-conditioning electronics board 33) are assembled in that order. FIGS. 3B and 3C show side and isometric views, respectively, of resulting sensor assembly 41, with shaft 43 added. Shaft hub 7 is secured to inductor board 15 with screws or other appropriate fasteners 40, of which only one is shown for simplicity of illustration, inserted through screw holes 13 and 19. When Allen screws 5 are tightened, hub clamp 1 clamps shaft hub 7 onto shaft 43 so that inductor board 15 does not rotate relative to shaft 43. In other words, when shaft 43 rotates, inductor board 15 rotates rigidly along with it. However, sensor board sub-assembly 39 is free to rotate relative to shaft 43 and thus relative to inductor board 15. Thus, if it is sensor board sub-assembly 39 which is held fixed, a rotation of shaft 43 causes relative rotation between inductor board 15 and sensor board sub-assembly 39.

Figure 4A:
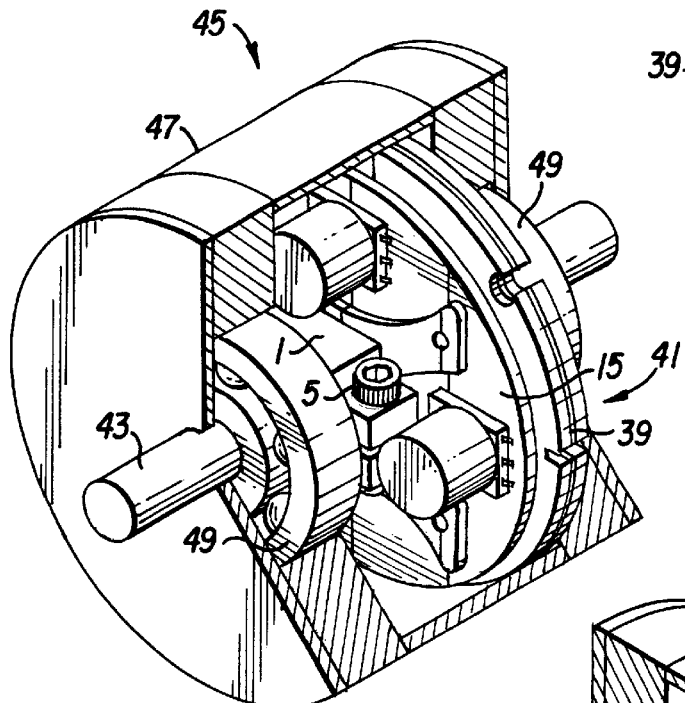
FIGS. 4A and 4B show two views of a sensor incorporating the sensor assembly of FIGS. 3A–C.
Figure 4B:
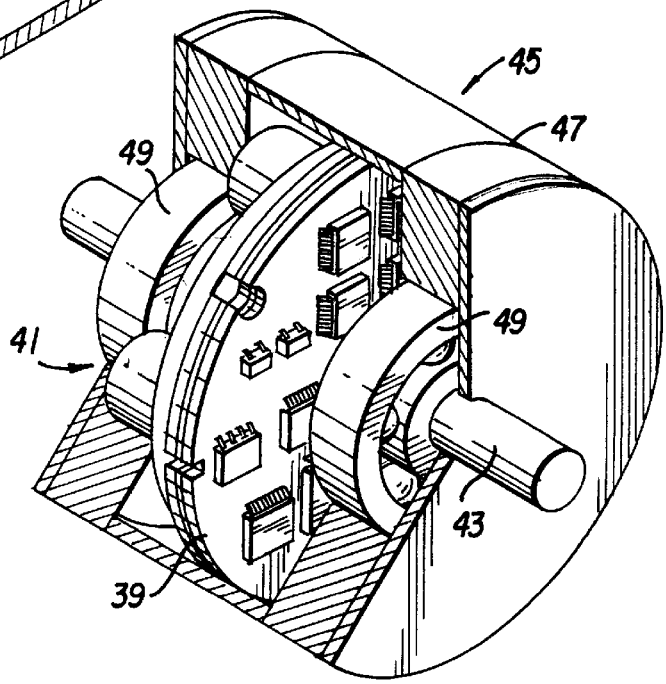

The assembled sensor is shown in a right isometric cut-away view in FIG. 4A and in a right rear isometric cut-away view in FIG. 4B. As shown in FIGS. 4A and 4B, sensor 45 includes sensor assembly 41 in housing 47, with shaft 43 protruding from housing 47. Sensor board sub-assembly 39 is fixed to the inside of housing 47 so as not to rotate relative to housing 47. Shaft 43 is mounted in housing 47 with ball bearings 49 or any other suitable bearings to allow rotation of shaft 43 relative to housing 47 and thus to allow rotation of inductor board 15 relative to sensor board sub-assembly 39. The various components can be connected to one another, to a power source and to a position signal output in any suitable way.

Integrating the electronics into the unit allows for the possibility of controlled motion performed by the sensor. Such controlled motion is possible, e.g., if the sensor is configured as a motor.

The position sensor disclosed herein can be configured for use as a rate sensor or as a motor. Such a configuration would require additional permanent magnets or electromagnets. The sensor coils would be driven such as to make the inductor board rotate while the wire-wound inductors transmitted position information back to the sensor windings simultaneously. Thus, one set of coils could be used for both actuation and sensing. The sensor could be operated in a housed or unhoused configuration.

By changing the electronics, a single sensor unit can output several different types of waveforms. These waveforms can also be used for both six-step and sinusoidal commutation of brushless motors. Also, the NASA resolver to 360° linear analog converter mentioned above produces a definite zero location, which is useful for position control.

Integrating the electronics into the sensor allows for the possibility of inclusion of the sensor windings on the electronics board. Such inclusion might require another ground plane on the electronics board but would eliminate the separate sensor winding board and mu-metal shield.

This invention has several advantages over the previous techniques used for rotary position sensing. By integration of the electronics into the housing, the position sensor does not require external signal conditioning. A single hardware unit can be configured for various outputs by simply replacing the electronics. The electronics can provide a zero location which is helpful in alignment with other machinery. The manufacturing techniques used to produce the sensor are low in cost when compared to those used for a resolver. The sensor is also physically smaller than a comparable resolver, especially if the sensor winding is included on the electronics board.

Integrating the electronics into the sensor is a notable improvement because the end user has only to apply power to receive rotary position. The electronics can be developed to produce various types of waveforms needed to commutate motors. The manufacturing and assembly of this sensor are simpler than those of the prior art, and the costs associated with producing the units are less when compared to the costs associated with producing resolvers. Integrating the signal conditioning electronics reduces the chance that external electronics would receive degraded or noisy sensor information.

The present invention offers the following advantages over known techniques for rotary position sensing. The sensor according to the present invention provides a continuous signal with infinite resolution. The sensor is insensitive to both axial and radial mounting tolerances and to both permanent and fluctuating magnetic fields. The sensor accuracy depends only on the orthogonality of the x and y axes on the sensor's printed wiring board and on the locations of the inductors. The sensor is made from low-cost components with low-cost manufacturing techniques and is smaller than a resolver of similar capability.

The present invention is particularly advantageous in, but not limited to, the integration of the signal conditioning electronics into the housing of the sensor disclosed in the above-mentioned co-pending application. Inclusion of the electronics into the housing makes for a complete sensor that accepts only power and returns the position of the rotary shaft.

While a preferred embodiment has been set forth, those skilled in the art who have reviewed this disclosure will readily appreciate that other embodiments can be realized within the scope of the invention. In alternative embodiments, other types of inductors or transformer windings could be used, as could windings internal to the printed wiring board. The position sensor can be operated as disclosed above, or with dual inductors and a single sensor winding, or with a single inductor and dual sensor windings. The inductor value and the number of sensor windings can be varied without changing the operation of the sensor. Also, the sensor board can be implemented with wires instead of a printed wiring board. The sensor can include more inductors, equally spaced apart mechanically to generate multi-speed resolver signals and/or windings that are rotated equally to produce multi-phase signals. The excitation frequency can be set to any appropriate value, and the waveform can be sinusoidal, square, triangular, or any other appropriate waveform.

The inductor board can be attached to the rotary shaft in any suitable way, such as pinning, epoxy, or press-fitting. The sensor has been disclosed as unhoused, but it can be packaged as a housed unit with bearings and an outer housing. The shaft can be a through shaft, a hollow shaft, or a single or dual output shaft. The inductor board can be configured as a brushless design, thus eliminating the brushes and slip rings.

We claim:

1. A position sensor, comprising:
    (a) a housing;
    (b) a movable shaft, disposed at least partially in the housing, for being moved in accordance with the position to be sensed;
    (c) a first sensor component, mounted on the shaft so as to rotate with the shaft, for emanating an internally or externally generated excitation signal; and
    (d) a second sensor component mounted in the housing so as not to rotate relative to the housing, the second sensor component comprising:
        (i) a first printed wiring board for producing a raw signal induced by the excitation signal in response to a rotary displacement between the first sensor component and the second sensor component;
        (ii) a second printed wiring board for converting the raw signal into a position-indicating signal; and
        (iii) a magnetic shield disposed between the first printed wiring board and the second printed wiring board;
    the movable shaft being secured to the first sensor component so that movement of the movable shaft causes the rotary displacement.

2. A position sensor as in claim 1, wherein:
    the first printed wiring board has a sensor coil formed thereon for producing the raw signal;
    the second printed wiring board has signal-conditioning electronics mounted thereon for signal-conditioning the raw signal.

3. A position sensor as in claim 2, wherein the first sensor component comprises an inductor board for emanating the excitation signal.

* * * * *